Nov. 12, 1929.   H. H. BRAND   1,735,230

DRIVE FIT NIPPLE

Filed April 15, 1924

INVENTOR
Harold H. Brand
BY
Richey, Slough & Watts
ATTORNEYS

Patented Nov. 12, 1929

1,735,230

UNITED STATES PATENT OFFICE

HAROLD H. BRAND, OF CLEVELAND, OHIO, ASSIGNOR, BY MESNE ASSIGNMENTS, TO THE ALEMITE CORPORATION, OF CHICAGO, ILLINOIS, A CORPORATION OF DELAWARE

DRIVE-FIT NIPPLE

Application filed April 15, 1924. Serial No. 706,778.

This invention relates to lubricant feeding nipples, and more particularly to nipples which are secured in position by a drive fit.

Nipples of this character are usually driven into the exterior end of a passage which is formed to feed lubricant to a bearing, such portion of the passage being of a diameter slightly less than the diameter of the portion of the nipple driven therein. The fit thus afforded is usually sufficient to retain the nipple in position when lubricant within the nipple and passage is not under pressure, or is under very low pressure. The lubricant feeding apparatus which are now used to inject lubricant into nipples are such that they create considerable pressure against the lubricant within the passage, either due to the lubricant not passing through the passage, or to the normal pressure at which the lubricant is forced into the nipple. Under such conditions the pressure of the lubricant within the bearing passage and the nipple will loosen the above described drive fit nipple from its bearing, so that it becomes inefficient for the purposes for which it is used.

The object of my invention is to provide a nipple of the drive fit type which can be secured in position so that it will not become loosened by pressure of the lubricant under any conditions.

Another object of my invention is to provide means for wedging a nipple within a passage so that it will not be forced out of position by pressure created against the lubricant injected therein.

These and other objects, and the invention itself will be described in detail hereinafter.

Figure 3:
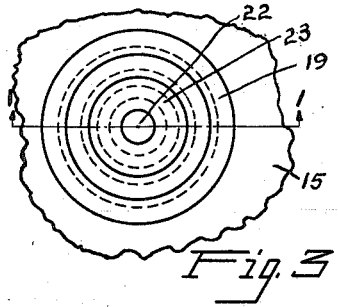
Figure 8:
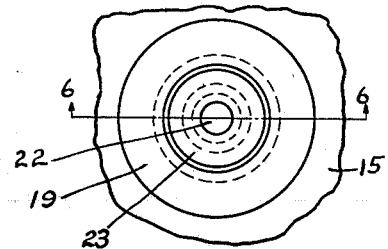
Figure 1:
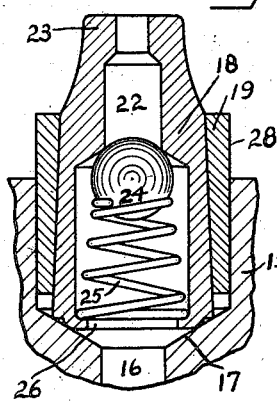
Figure 2:
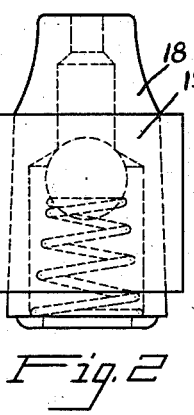
Figures 6, 7:
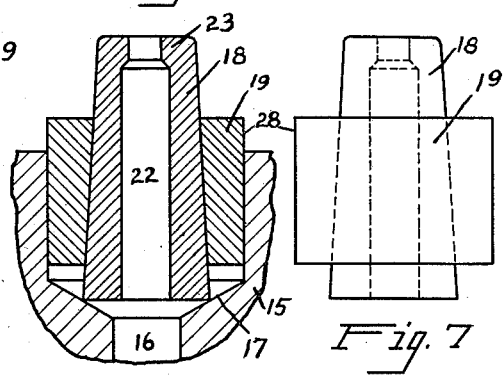
Figure 4:
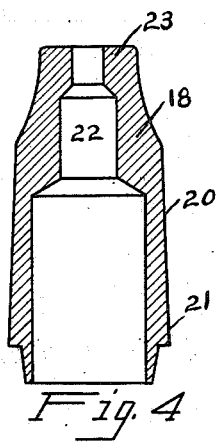
Figure 5:
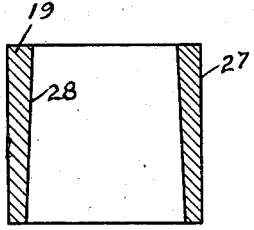
Figure 9:
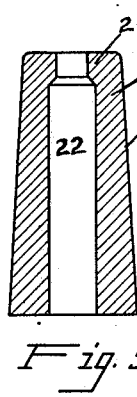
Figure 10:
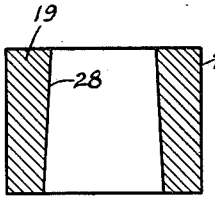

In the accompanying drawings illustrating my invention, Fig. 1 is an enlarged vertical sectional view taken on line 1—1 of Fig. 3, of my improved nipple secured within a lubricant feeding passage, Fig. 2 is an enlarged side elevation of the nipple and securing bushing removed from the element to which it is attached; Fig. 3 is a top plan view of the nipple secured with a bearing; Fig. 4 is a vertical medial sectional view of the nipple as first formed prior to spinning the end to assemble the ball and spring therein; Fig. 5 is a similar view of the bushing; Fig. 6 is an enlarged medial vertical section taken on line 6—6 of Fig. 8 of a modified form of nipple and bushing in position with a bearing; Fig. 7 is a side elevation of the modified form of nipple and bushing removed from the element to be lubricated; Fig. 8 is a top plan view of the modified nipple secured to a bearing; Fig. 9 is a medial section of a modified form of nipple; and Fig. 10 is a medial section of the modified form of bushing.

Referring to the drawings by characters of reference 15 represents an element, such as a bearing, having a passage 16 therein for supplying lubricant to a rotating or moving part. The end of the passage, adjacent the exterior of the bearing, is preferably circular in form and extends inwardly a sufficient distance to receive a substantial portion of a nipple. The exterior and interior portions of the passage which have different diameters are joined by a tapered passage thereby providing a shoulder 17 which limits the insertion of the nipple into the passage and provides a seat against which the outlet base of the nipple engages.

The nipples 18 adapted for use in this connection are of less diameter than the exterior portion of the passage in the bearing, and an element 19, which I refer to herein as a bushing, is arranged to wedge the nipple within such portion of the passage. I am aware that in carrying out my invention various types of elements can be used in various ways to wedge the nipples within the passage in a bearing, but for the purpose of illustrating my invention I have shown but one of such forms.

The outer surface 20 of the illustrated nipples is circular and tapered lengthwise, so that the base or outlet end 21 has the largest diameter. A passage 22 extends axially through the nipples and is in open communication with the passage in the bearing when the nipples are secured in position. The diameter of the passage extending through the contact face 23 of the nipple is reduced, providing a small opening through which lubricant must pass to enter the nipple. In Figs. 1 to 4, I have shown a ball valve 24 which normally is maintained in position by a coil spring 25 so that it closes the passage in the nipple. The coil spring engages the ball at one of its ends and is retained within the passage in the nipple by a flange 26, formed by turning in the base flange of the nipple shown in Fig. 4, so that the ball and spring form a unit with the nipple. The nipple, shown in Figs. 6 to 9, is provided with an unrestricted passage which extends axially therethrough, as previously described. This last mentioned nipple has a continuous circular exterior lengthwise tapered surface, while the first mentioned nipple is of reduced diameter at its inlet end, terminating in a contact face of substantially the same size and form as the continuous tapered nipple.

The wedge element 19 which I have illustrated is in the form of a bushing which is provided with a cylindrical outer surface 27 and a circular longitudinally tapered inner surface 28. The bushing is of such external dimension that it can slide into the exterior portion of the passage in the bearing.

The bushing is placed over the nipple with its tapered inner surface in substantially parallel relation with the tapered outer surface of the nipple. In assembling the nipple with the bearing, the nipple is inserted into the exterior end of the passage in the bearing, until its outlet end or base engages against the shoulder 17. The bushing can be placed in proper relation over the nipple either before or after its insertion into the passage in the bearing, whereupon the bushing is driven into the exterior portion of the passage in the bearing. The bushing is driven inwardly until it is securely wedged between the outer surface of the nipple and the wall of the bearing forming the passage.

The wedge bushing when driven into the passage will secure the nipple within the passage in the bearing, so that vibration, and pressure exerted by the lubricant can not loosen it. The nipple and bushing are both preferably of such a length that they extend exteriorly of the bearing when secured therewith, so that when desired they can be removed. This arrangement makes a tight fit between the nipple, bushing and bearing providing a leak proof joint, so that lubricant under pressure will not work therebetween. The passage through the nipple communicates with the passage in the bearing, and the outer face of the nipple is formed so that a lubricant dispensing apparatus can be maintained thereagainst to express lubricant under pressure through said nipple and bearing passage.

Various changes can be made in the construction described without departing from the spirit of my invention and the scope of the appended claims.

What I claim is:—

1. A lubricant receiving terminal comprising a nipple having an external face accurately shaped to form a tight contact seal under manual pressure, a machine element having an aperture therein, and means for wedging the nipple tightly in the aperture without driving on it, said means comprising an annulus driven into place between the outer surface of said nipple and the inner surface of said aperture, the inner surface of said annulus and the opposed surface of said nipple having a conical taper for producing the wedging action, said aperture having a shoulder leading to an extension bore of smaller diameter, said shoulder forming an abutment for the inner end of said nipple during the driving.

2. A lubricant receiving terminal comprising a nipple having an external face accurately shaped to form a tight contact seal under manual pressure, a machine element having an aperture therein, and means for wedging the nipple tightly in the aperture, said means comprising an unbroken annulus driven into place between the outer surface of said nipple and the inner surface of said aperture, the inner surface of said annulus and the opposed surface of said nipple having a conical taper for producing the wedging action.

3. A lubricant receiving terminal comprising a nipple having an external face accurately shaped to form a tight contact seal under manual pressure, a machine element having an aperture therein, and means for wedging the nipple tightly in the aperture, said means comprising an unbroken annulus driven into place between the outer surface of said nipple and the inner surface of said aperture, one surface of said annulus and the opposed surface engaging the same having a conical taper for producing the wedging action.

4. A lubricant receiving terminal comprising a nipple having an external face accurately shaped to form a tight contact seal under manual pressure, a machine element, having an aperture therein, and means for wedging the nipple tightly in the aperture, said means comprising an unbroken annulus driven into place between the outer surface of said nipple and the inner surface of said aperture.

In testimony whereof I hereunto affix my signature this 10th day of April, 1924.

HAROLD H. BRAND.